United States Patent
Bird

[15] 3,635,507
[45] Jan. 18, 1972

[54] ADJUSTABLE SUPPORT FOR CYCLE SADDLE

[72] Inventor: Martin J. Bird, Norwalk, Ohio

[73] Assignee: Persons-Majestic Mfg. Company, Worcester, Mass.

[22] Filed: Oct. 8, 1970

[21] Appl. No.: 79,065

[52] U.S. Cl. .............................287/54 C, 280/289, 297/195
[51] Int. Cl. ...........................................................F16b 7/00
[58] Field of Search...................297/195; 248/125; 280/289; 287/54 C

[56] References Cited

UNITED STATES PATENTS

| 3,486,727 | 12/1969 | Timms | 297/195 X |
| 3,405,894 | 10/1968 | Jordan et al. | 248/125 X |
| 3,486,777 | 12/1969 | Bird | 287/54 C |

Primary Examiner—Andrew V. Kundrat
Attorney—Charles R. Fay

[57] ABSTRACT

An adjustable support for cycle saddles which comprises an elongated member to be connected at one end thereof, to the end plate or axle of the rear wheel of the cycle, the member extending upwardly for connection to the saddle at the rear portion thereof and having a series of holes, a one-piece clamping bracket for the member adapted to be bolted to its respective end plate, said bracket including an integral locking key in the form of a bent over tang entering into a selected hole in the respective member of the support and being self-locking thereto when connected to the end plate or axle.

5 Claims, 6 Drawing Figures

PATENTED JAN 18 1972
3,635,507
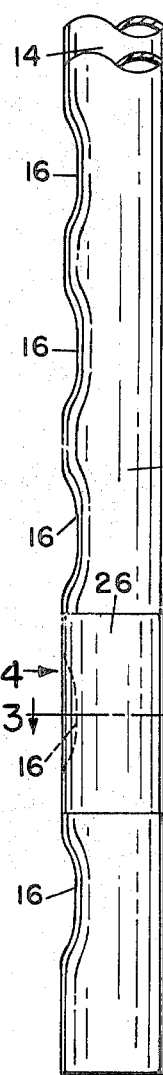
FIG. 1
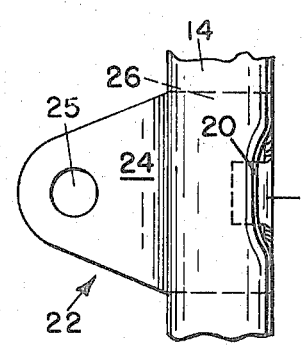
FIG. 2
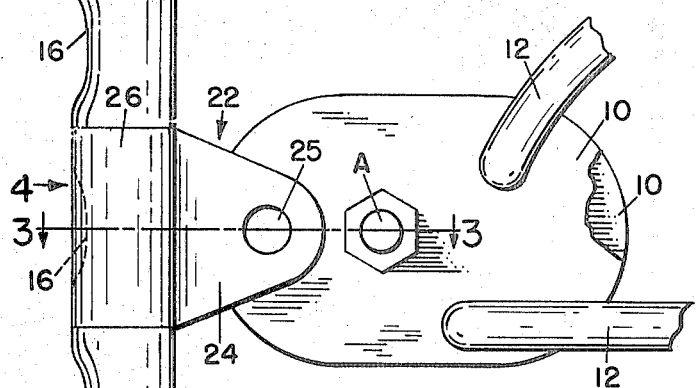
FIG. 4
FIG. 6
FIG. 5
FIG. 3
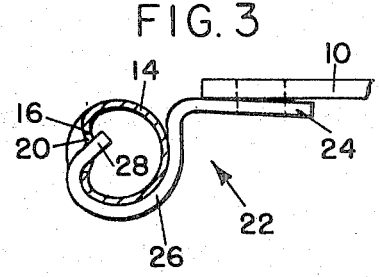
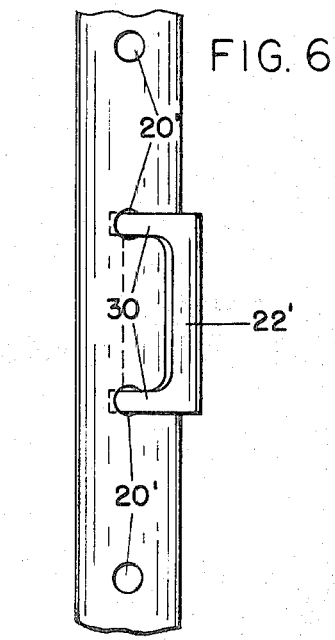
INVENTOR
Martin J. Bird
BY Chas R. Fay,
ATTORNEY

ADJUSTABLE SUPPORT FOR CYCLE SADDLE

BACKGROUND OF THE INVENTION

The provision of adjustable supports, braces, or struts supporting a cycle saddle from the hub portion of the rear wheel, presents a problem in that it is difficult to provide an inexpensive adjustment which at the same time is quick and easy to assemble correctly while providing sufficient strength to stand up under the hard usage ordinarily given these members. It has been proposed to have a bracket surrounding each of the legs of the support, the bracket being bolted to the end plates and interengaging means on the bracket and the leg of the support, see U.S. Pat. No. 3,486,777 dated Dec. 30, 1969, but this requires the disengagement of the interengaging means before the adjustment can be made, and at times the interengaging means, a key, is incorrectly and thus ineffectually assembled.

SUMMARY OF THE INVENTION

The present invention solves this problem by providing a one-piece locking bracket having a tang or tangs which extend through a hole or holes in a series of holes in the respective member of the cycle support, the tangs being arranged at the opposite side of the member from the end plate of the hub, the tangs lying at an angle to the main part of the bracket. This maintains the parts in position when assembled to the end plate. It will be seen that it is a very simple operation to apply or remove the bracket so that the bracket is easily moved along the member for adjustment because there are no interengaging parts between the bracket and the member except the tangs. No separate locking key is needed.

Furthermore the row of spaced holes in the member face to the rear and this provides for a handier place for manipulation of the parts.

BRIEF DESCRIPTION OF THE DRAWINGS

FIG. 1 is a view in front elevation illustrating the attachment of one of the members of the support with relation to a respective end plate of a cycle;

FIG. 2 is a rear view thereof with the end plate removed;

FIG. 3 is a section on line 3—3 of FIG. 1;

FIG. 4 is a view in elevation looking in the direction of arrow 4 in FIG. 1;

FIG. 5 is a view similar to FIG. 2 showing a modification, and

FIG. 6 is a view similar to FIG. 4 but showing the modification.

DESCRIPTION OF THE PREFERRED EMBODIMENT

In illustrating the invention it is shown as applied to a generally conventional bicycle which has the usual frame, front wheel, handlebars, saddle, etc., these not being shown as being unnecessary to an understanding of the invention. However reference numerals 10, 10 indicate the two end plates for usual frame parts 12, 12, the axle being shown at A, the end plates 10, 10 being generally parallel but spaced by the usual hub on the axle. The cycle saddle support is of the type comprising an elongated U-shaped two-legged member as is well known, and in this case only the lower ends of the two legs (members) thereof are shown, these being indicated at 14, 14. These members are alike and extend upwardly to be connected to the rear portion of the saddle as is well known in order to support the latter at the rear portion thereof.

In the present case the lower ends of the legs 14 are provided with a series of indentations 16, 16, 16, which are conveniently pressed or punched so as to provide a generally funnellike impressed effect, see FIG. 2, surrounding the actual openings 20, these openings being at the rear of the legs (members) as respects the entire cycle.

A completely one-piece bracket which is generally indicated at 22 is formed with a generally flat base 24 having a hole 25 for reception of a bolt for securing it to the end plate, or to receive the axle. The flat plate extends in an arcuate bend as at 26 to partially surround leg 14 when in place and then terminates in a tang 28. This tang is generally straight lying at an acute angle relative to base 24 and in effect pointing, at an angle, towards the front, in the direction of the base 24.

The apertures 20 may be elongated to receive a relatively wide tang, for stability, and when bolted to the end plate or received on an axle, the connection is strong and rigid. This effect is enhanced by the fact that with the tang located as shown, fully home in its hole, the base 24 of bracket 22 lies in a nonparallel relation to the end plate 10, see FIG. 3, and acts as its own spring washer.

FIGS. 5 and 6 show a slight modification wherein two spaced tangs 30, 30 are utilized on bracket 22' for greater stability. In this case the holes 20' can substantially round but must be placed on even centers for removal and attachment for adjustment.

I claim:

1. The combination of a plate and an elongated member with a bracket for securing the plate to the member,
    said bracket comprising a unitary piece having a portion thereof overlying said plate and another curved portion partially encompassing the elongated member,
    an aperture in said elongated member at a side aspect thereof remote from said plate, and a tang integral with the terminal end portion of said curved portion of the bracket lodged in the member through said aperture,
    said tang extending in a direction toward the plate and being at an inclination with respect thereto.

2. The combination of claim 1 including a second tang entering a second aperture in said elongated member.

3. The combination of claim 1 including a series of apertures in said elongated member, said apertures being mutually spaced therealong for adjustment of said bracket relatively with respect thereto.

4. The combination of claim 1 including a series of apertures in said elongated member, said apertures being mutually spaced therealong for adjustment of said bracket relatively with respect thereto, and a second tang on said curved portion of said bracket, said second tang entering the next adjacent aperture with respect to the first tang, said apertures being spaced apart correspondingly to the spacing of the tang on the bracket.

5. The combination of claim 1 wherein the plate is in a fixed position and the respective position of said aperture and tang with respect to the flat portion of said bracket is such that the latter is originally in a canted position with respect to the plate, and including fastening means for securing the canted portion of the bracket with respect to the plate in flatwise condition so that the flat portion of the bracket acts as a spring washer.

* * * * *